(12) United States Patent
Jarvis et al.

(10) Patent No.: US 9,145,205 B2
(45) Date of Patent: Sep. 29, 2015

(54) ROTOR ASSEMBLY FOR A ROTORCRAFT

(75) Inventors: Christopher Patrick Jarvis, London (GB); Guy Jonathan James Rackham, London (GB)

(73) Assignee: Guy Jonathan James Rackham, New York, NY (US)

( * ) Notice: Subject to any disclaimer, the term of this patent is extended or adjusted under 35 U.S.C. 154(b) by 826 days.

(21) Appl. No.: 13/389,416

(22) PCT Filed: Aug. 6, 2010

(86) PCT No.: PCT/GB2010/051306
§ 371 (c)(1),
(2), (4) Date: Apr. 12, 2012

(87) PCT Pub. No.: WO2011/015879
PCT Pub. Date: Feb. 10, 2011

(65) Prior Publication Data
US 2012/0189450 A1 Jul. 26, 2012

(30) Foreign Application Priority Data
Aug. 7, 2009 (GB) .................................. 0913834.8

(51) Int. Cl.
| | |
|---|---|
| *B64C 27/54* | (2006.01) |
| *B64C 27/32* | (2006.01) |
| *B64C 27/12* | (2006.01) |
| *B64C 27/59* | (2006.01) |

(52) U.S. Cl.
CPC ................. *B64C 27/32* (2013.01); *B64C 27/12* (2013.01); *B64C 27/59* (2013.01)

(58) Field of Classification Search
CPC ........ B64C 27/00; B64C 27/46; B64C 27/48; B64C 27/03; B64C 27/12; B64C 27/592
USPC .......................................... 416/108, 109, 203
See application file for complete search history.

(56) References Cited

U.S. PATENT DOCUMENTS

| | | | |
|---|---|---|---|
| 1,879,323 A | | 9/1932 | Koch |
| 1,880,302 A | * | 10/1932 | Van Lemmeren ............. 416/109 |
| 2,050,142 A | * | 8/1936 | White ........................... 416/135 |
| 2,273,303 A | | 2/1942 | Waldron |
| 2,455,006 A | * | 11/1948 | Hays ............................. 416/104 |
| 3,448,811 A | | 6/1969 | Derschmidt |

(Continued)

FOREIGN PATENT DOCUMENTS

| | | |
|---|---|---|
| CN | 2889900 Y | 4/2007 |
| CN | 101275584 A | 10/2008 |

(Continued)

OTHER PUBLICATIONS

Examination Report from United Kingdom Application No. GB0913834.8 mailed Dec. 11, 2013.

(Continued)

*Primary Examiner* — Nathaniel Wiehe
*Assistant Examiner* — Kayla McCaffrey
(74) *Attorney, Agent, or Firm* — Merchant & Gould P.C.

(57) ABSTRACT

A rotor assembly (5) for a rotorcraft, such as a helicopter, includes rotors (7) rotatable about a hub (17). The assembly (5) is operable to vary the angular speed of the rotors (7) about the hub (17), relative to one another. The assembly (5) may include a drive operable to drive each of the rotors (7) at a different radial distance from the hub.

16 Claims, 15 Drawing Sheets

(56) References Cited

U.S. PATENT DOCUMENTS

| | | | |
|---|---|---|---|
| 3,582,023 A * | 6/1971 | Rosta et al. | 244/23 C |
| 3,592,559 A * | 7/1971 | Ward | 416/121 |
| 3,841,586 A | 10/1974 | Broadley et al. | |
| 3,874,817 A | 4/1975 | Ferris | |
| 3,921,939 A | 11/1975 | Garfinkle | |
| 4,123,018 A | 10/1978 | Tassin de Montaigu | |
| 4,195,800 A | 4/1980 | Wallace | |
| 4,326,834 A | 4/1982 | Ostrowski | |
| 4,392,781 A | 7/1983 | Mouille et al. | |
| 4,496,284 A | 1/1985 | Watson | |
| 4,598,887 A | 7/1986 | Jordan | |
| 4,695,227 A | 9/1987 | Head et al. | |
| 5,071,319 A | 12/1991 | McCafferty | |
| 5,188,512 A | 2/1993 | Thronton | |
| 5,297,759 A | 3/1994 | Tilbor et al. | |
| 5,297,934 A | 3/1994 | Desjardins | |
| 5,306,119 A * | 4/1994 | Bandoh et al. | 416/168 R |
| 5,383,767 A | 1/1995 | Aubry | |
| 5,474,424 A | 12/1995 | Bietenhader et al. | |
| 5,588,801 A | 12/1996 | Commelin et al. | |
| 6,062,508 A | 5/2000 | Black | |
| 6,280,141 B1 | 8/2001 | Rampal et al. | |
| 6,447,421 B1 | 9/2002 | Wren | |
| 6,481,968 B1 | 11/2002 | Fischer et al. | |
| 2001/0004440 A1 | 6/2001 | Bansemir | |
| 2003/0178528 A1 | 9/2003 | Zoppitelli et al. | |
| 2004/0011921 A1 | 1/2004 | Gorshkov | |
| 2004/0144892 A1 | 7/2004 | Gerbino | |
| 2005/0067527 A1 | 3/2005 | Petersen | |
| 2006/0011777 A1 | 1/2006 | Arlton et al. | |
| 2007/0095969 A1 | 5/2007 | Walliser | |
| 2007/0125907 A1 | 6/2007 | Lappos et al. | |
| 2007/0181741 A1 | 8/2007 | Darrow, Jr. et al. | |
| 2008/0111399 A1 | 5/2008 | Zierten | |
| 2008/0245924 A1 | 10/2008 | Arlton et al. | |
| 2009/0035133 A1 | 2/2009 | Ferman | |
| 2009/0129929 A1 | 5/2009 | Bahadir | |
| 2009/0175725 A1 | 7/2009 | Podgurski et al. | |

FOREIGN PATENT DOCUMENTS

| | | |
|---|---|---|
| DE | 38 30 309 A1 | 3/1990 |
| DE | 196 30 665 A1 | 2/1998 |
| DE | 299 02 723 U1 | 1/2000 |
| DE | 20 2004 010 057 U1 | 8/2004 |
| DE | 20 2004 016 509 U1 | 12/2004 |
| DE | 103 56 231 A1 | 6/2005 |
| DE | 20 2005 019 243 U1 | 2/2006 |
| DE | 10 2005 058 805 A1 | 6/2007 |
| EP | 0 680 876 A1 | 11/1995 |
| EP | 1 990 275 A1 | 11/2008 |
| FR | 2 328 609 | 5/1977 |
| FR | 2 260 106 A1 | 3/1989 |
| GB | 342071 | 1/1931 |
| GB | 648777 | 1/1951 |
| GB | 1110062 | 4/1968 |
| WO | WO 00/27698 | 5/2000 |
| WO | WO 2005/100154 A1 | 10/2005 |
| WO | WO 2007/075805 A2 | 7/2007 |
| WO | WO 2007/081337 A2 | 7/2007 |
| WO | WO 2009/010644 A2 | 1/2009 |
| WO | WO 2009/073022 A1 | 6/2009 |
| WO | WO 2009/087292 | 7/2009 |
| WO | WO 2009/093491 | 7/2009 |

OTHER PUBLICATIONS

International Search Report for corresponding International Application No. PCT/GB2010/051306.

Written Opinion for corresponding International Application No. PCT/GB2010/051306.

* cited by examiner

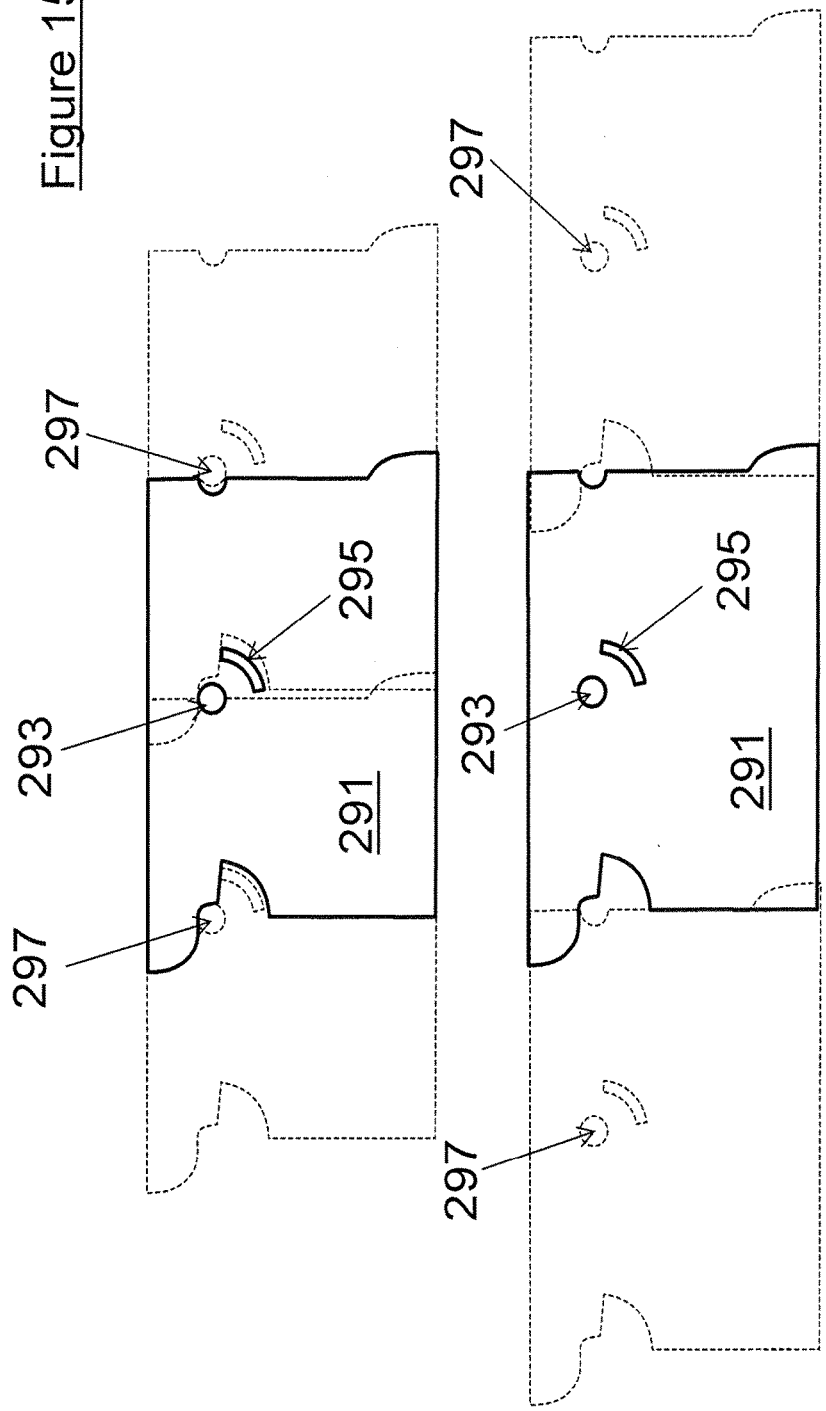

ROTOR ASSEMBLY FOR A ROTORCRAFT

This application is a National Stage Application of PCT/GB2010/051306, filed 6 Aug. 2010, which claims benefit of Serial No. 0913834.8, filed 7 Aug. 2009 in the United Kingdom and which applications are incorporated herein by reference. To the extent appropriate, a claim of priority is made to each of the above disclosed applications.

TECHNICAL FIELD

The present invention relates to rotorcraft, and more particularly to rotor assemblies for rotorcraft.

BACKGROUND OF THE INVENTION

During forward motion of a rotorcraft, such as a helicopter, there is a difference between the relative air speed of an advancing rotor blade and a retreating rotor blade. As the lift generated by a rotor blade is dependent on the speed the rotor blade passes through the air, this imbalance in relative air speed tends to shift the centre of lift to one side of the rotorcraft. To maintain a balanced lift profile across the rotorcraft, the higher lift generated by the faster-moving advancing rotor blade is typically offset by decreasing its pitch (i.e. its angle of attack) relative to the retreating rotor blade. Nevertheless, the maximum forward speed of a rotorcraft may still be limited because the retreating blade may approach stall and/or the tip region of the advancing blade may approach a supersonic speed.

The pitch control on known rotor assemblies may also enable the rotorcraft to be manoeuvred by moving the centre of lift away from the axis of rotation. Known pitch control mechanisms can give rise to a number of disadvantages. For example: the mechanisms tend to be extremely complex and typically comprise various hinges and levers which have high maintenance costs and onerous safety requirements; excessive noise and vibration can occur because the pitch of the blade is altered, at relatively high frequency, during revolution of the rotor blades; and/or the rotor hub must be extremely strong as it is subjected to the intertial loads of the rotor blades and the loads associated with pitching the rotor blades, and it also transmits the lift force from the blades to the rotorcraft fuselage.

SUMMARY OF THE INVENTION

The present invention seeks to remove or mitigate at least some of the above-mentioned disadvantages.

According to a first aspect of the invention, there is provided a rotor assembly for a rotorcraft, the assembly comprising a plurality of rotor blades rotatable about a hub, wherein the assembly is operable to vary the angular speed of the rotor blades about the hub, relative to one another. Varying the relative angular speed of the rotor blades around the hub changes the lift distribution around the hub and shifts the centre of lift towards the faster moving blades. The lift imbalance caused by the differing relative air speed of the advancing and retreating blades in forward flight, can therefore be offset. This may allow a higher maximum forward speed to be attained. Varying the relative angular speed of the rotor blades (and therefore the lift distribution around the hub) may also be used to manoeuvre the rotorcraft.

When there is a difference in the relative angular speed of the rotor blades, the angular spacing between the rotor blades will vary accordingly. A change in lift may also be generated by this angular imbalance in the spacing of rotor blades around the hub. As the lift of the rotor blades is approximately proportional to the square of their speed, the increase in lift as a result of their speed increase tends to more than offset any decrease increase in lift caused by a reduced lifting surface (the rotor blades will tend to be further apart when travelling faster and closer together when travelling slower).

The angular speed of the rotor blades around the hub is preferably arranged to vary in a cyclic manner. The angular speed of the rotor blades may be arranged to vary in a sinusoidal manner. A sinusoidal variation has been found to facilitate a particularly smooth acceleration/deceleration of the rotor blades around the hub. The rotor blades may be independently controllable but are preferably all arranged to follow the same cyclic variation in angular speed around the hub. The cycle is preferably repeated once every revolution of the rotor blades around the hub.

The rotor blades are preferably arranged in substantially the same plane of rotation.

Known rotorcraft rotor assemblies tend to comprise a plurality of rotor blades that are fixedly mounted to the circumference of a rotatable hub. In contrast, according to the first aspect of the invention, the assembly comprises a plurality of rotor blades rotatable about a hub. Preferably the hub is fixed, for example it is fixedly mounted on the rotorcraft.

It is desirable to be able to rapidly accelerate the rotor blades in a rotor assembly as this may enable a quick take-off. A rapid acceleration of the rotor blades may also reduce the need for the rotor blades to be rotated up to an idling speed long before take off (for example when crew and/or passengers are embarking), thereby improving safety. It can also be desirable to be able to quickly decelerate the rotor blades in a rotor assembly, for example so that the rotor blades can be stationary during disembarkation of the crew/passengers.

Rotor assemblies on known rotorcraft typically comprise a rotating hub having a plurality of rotor blades fixed thereto. The rotor assemblies tend to include a complex hinge mechanism for varying the pitch of rotor blades as the hub rotates. There is a limit to how quickly these known rotor assemblies can change their rotational speed. In particular, the maximum torque such arrangements can withstand tends to be limited by the need to keep the weight and complexity of the hinge mechanism within certain practical limits.

The assembly may comprise driver arranged to drive the rotor blades at a radial distance away from the hub. Driving the rotor blades around a hub at a radial distance from that hub has been found to give rise to a number of benefits. For example, the assembly may be able to withstand a greater torque than some known assemblies and may therefore be operable to more quickly accelerate or decelerate the rotor blades. Rapid acceleration of the rotor blades may also be used in combination with pitch variation of the rotor blades to quickly manoeuvre the rotorcraft.

The driver is preferably arranged to drive the rotor blades by applying a drive force at the radial distance from the hub. The driver are preferably arranged to drive the rotor blade at a radial distance from the surface of the hub. The driver are preferably arranged to drive the rotor blade at least 5%, and more preferably 10%, and yet more preferably 15% of the length of the rotor blade. The driver may be arranged to drive the rotor blade at least 0.2 m, and more preferably at least 0.5 m along the length of the rotor blade.

The assembly preferably comprises a clutch for engaging and disengaging rotation of the driver from a power source for powering the driver (for example an engine). The power source for driving the driver may therefore be switched on (for example to warm up and/or allow safety checks to be performed) without rotating the rotor blades. This enables certain advantages, for example, passengers or crew can be loaded whilst the engine is running without being subjected to the noise and vibration of the rotating blades. In embodiments of the invention in which the rotor assembly is arranged to withstand relatively high torque, the power source may be able to be run to a relatively fast operating speed before engaging with the driver, thereby rapidly accelerating the rotor blades.

The driver may be operable to drive each of the plurality of rotor blades at a different radial distance from the hub. Driving the rotor blades at different radial distances may facilitate a relatively simple arrangement for varying the angular speed of the rotor blades. For example, if the rotor blades are driven about different radii at the same tangential speed, the relative angular speed between the blades will be varied.

The driver may comprise a rotatably driven drive ring, the rotor blades being coupled to the circumference of the drive ring. The drive ring is preferably circular. The drive ring may be in the form of a disc, but is preferably in the form of an annulus. The rotor blades are preferably coupled to the circumference of the drive ring such that the circumferential spacing between the rotor blades around the circumference of the drive ring is fixed. It will be appreciated that due to the thickness of the rotor blades, there may be a small change in the circumferential spacing of the rotor blades if the angular spacing of the rotor blades changes during rotation of the drive ring. It will be appreciated however, that the circumferential spacing between at least part of each rotor blade (for example the central axis of the rotor blade that typically passes along the length of the shaft and through the centre of lift of the rotor blade) is fixed.

The rotor assembly is preferably arranged to be operable between a first, neutral lift, configuration in which the axis of rotation of the rotor blades is co-axial with the axis of the hub, and a second, offset lift, configuration in which the axis of rotation of the rotor blades is spaced apart from the axis of the hub. The axes of rotation may be parallel in both the first and second configurations.

The drive ring may be moveable, preferably laterally moveable, relative to the hub, such that the drive ring is operable to drive each of the plurality of rotor blades at a different radial distance from the hub. The drive ring is preferably laterally moveable to move the axis of rotation of the drive ring from a configuration in which it is co-axial with the hub, to a configuration in which it is spaced apart from the axis of the hub. The assembly may comprise an actuator for moving the drive ring. The assembly may comprise a plurality of actuators (for example a pair of orthogonally positioned actuators) for moving the drive ring forward/back, left/right, or a combination of the two. The drive ring may be rotatable around a track. The track may be laterally moveable. It will be appreciated that a lateral movement may be any movement in any direction within the horizontal plane containing the drive ring (for example forward/aft, left/right, or a combination thereof). The movement is preferably transverse to the axis of the driver.

The driver may be coupled to a drive shaft via a belt arrangement. In embodiments in which the drive ring is rotatable around a track, the belt may be arranged to rotate the drive ring in the track.

The assembly may be arranged such that the tangential speed of the rotor blades at each radial distance is equal. For example, by having the rotor blades coupled to the circumference of the drive ring such that the circumferential spacing between the rotor blades around the circumference of the drive ring is fixed, the tangential speed of each rotor blade at the circumference of the drive ring, is equal. In an embodiment in which the rotor blades are being driven around the fixed hub at different radial distances around the hub, the relative angular speed of the rotor blades will vary accordingly around the hub.

The rotor blades may be slideably moveable through the circumference of the drive ring in a direction along the length of the rotor blade, such that lateral movement of the drive ring alters the angular spacing of the rotor blades. This arrangement allows the driving force from the driver to be applied at different radial distances along the rotor blade. The drive ring may comprise a plurality sleeves through which the rotor blades pass. The location of the sleeves on the circumference of the drive ring is preferably fixed, but the sleeves may be pivotably mounted to enable the angle of the sleeve to vary during rotation of the drive ring.

Each rotor blade may be mounted on the hub via a mounting, the driver being arranged to drive the rotor blades at location radially outward of the mounting. The mounting may be slideably moveable around the circumference of the hub. The hub may comprise a track in which the mounting is slideably received. The assembly may be arranged such that the mountings of adjacent rotor blades may, at least partially, overlap around the circumference of the hub. For example, the hub may comprise two circumferential tracks; an outer track and an inner track located within the outer track. Adjacent mountings may be received in inner and out tracks respectively. The mountings may be arranged such that the mounting on the inner track is receivable, at least partially, within the mounting on the outer track. The adjacent mountings are preferably differently configured.

Some known rotor assemblies in which the rotor blades are fixed to a rotatable hub, and limited to having relatively few rotor blades due to the complexity of the hub mechanism. Embodiments of the present invention may provide a simplified arrangement and therefore enable more rotor blades to be mounted on the rotor assembly. The assembly may comprise at least 4 rotor blades, and more preferably at least 6 rotor blades. The assembly may comprise at least 10, or even 12 rotor blades. The assembly may comprise up to 20 rotor blades. Having a relatively large number of rotor blades may reduce imbalances and/or vibrations that arise from shifting the relative spacing between the blades.

The more rotor blades, the higher the lift for a given rotational speed. Accordingly, to achieve a given lift with an assembly comprising a relatively large number of rotor blades, the rotational speed may be reduced. By running the rotor assembly at a lower speed the vibration and sound (which increase logarithmically or in a squared relationship with speed) may be reduced. The impact of forward motion on the relative speed difference between the advancing and retreating rotor blades is proportionally more significant at lower rpm. Arrangements in which the relative angular speed of the rotor blades may be varied are therefore particularly advantageous when used in conjunction with rotor assemblies operating at low rpm.

Alternatively or additionally, other parameters of the rotors (such as the length of the rotor blades, their area or their lift co-efficient) may be changed to offset the increase in lift caused by a higher number of rotor blades.

Preferably the rotor assembly comprises load transferring assembly, located radially outward of the junction between the rotor blade and the hub, the load transferring assembly being arranged to transfer at least some of the lifting force generated by the rotor blades, to a location away from the hub. The load transferring assembly may therefore reduce certain loads on the hub. In embodiments of the invention comprising a housing, the lifting force is preferably transferred to the housing.

The variation of pitch of a rotor blade is achieved in many known helicopter configurations by the use of a swashplate mechanism; a circular planar surface centered perpendicular to the main drive shaft that can be tilted and in some cases moved vertically with respect to the central drive shaft about which the rotor blades rotate. The pitch of each rotor blade is typically governed by the height of the surface of the swash plate at the corresponding position about the circumference of the central drive shaft. A further aspect of the invention provides an alternative method to vary the rotor blade pitch. According to this further aspect of the invention there is provided a rotor assembly comprising a plurality of rotor blades and a pitch controller for varying the pitch of the rotor blades, wherein the pitch controller comprises a guide and a linkage moveable along the guide, the linkage being connected to the rotor blade such that the pitch of the rotor blade is variable in dependence on the separation between the rotor blade and the guide. The pitch controller may be arranged on the rotor assembly according to the first, or any other, aspect of the invention. Each rotor blade may comprise a blade having a tip and a root, and a shaft extending from the root of the blade to the hub. The shaft may be coupled to the root of the blade in a variety of ways; for example the root of the blade may be fixedly coupled to the shaft, or the blade may be rotatable relative to, and for example about the longitudinal axis of, the shaft. The linkage may be connected to the blade of the rotor blade.

The pitch controller may comprise an actuator arranged to vary the separation between the rotor blade and guide. The pitch controller may comprise a plurality of independently actuatable actuators arranged to vary the separation between the rotor blade and guide. The actuators may, for example, be hydraulic actuators. The actuators may be arranged to vary the height of the guide relative to the rotor blades.

Known swashplate assemblies typically comprise a rigid, planar, plate that is tilted at an angle to the axis of rotation of the rotor blades. In an embodiment of the present invention, the guide may be flexible such that the guide may be deformed from a planar configuration to a non-planar configuration. By deforming the guide to a non-planar configuration, the pitch controller may provide a greater variation in pitch during one revolution of the rotor blades. This is particularly of benefit in an arrangement in which the angular speed of the rotor blades can be varied, because it can be used in conjunction with the speed variation to control the lift distribution. Adjustments may be made that support complex variations of the pitch about the circumference. This may facilitate more refined maneuverability, counteract vibration and might improve or resolve other behaviors.

The guide may comprise a ring member. The ring member may comprise a circumferential track along which the linkage is moveable. The linkage may be arranged in relation to the guide such that both tensile and compressive loads in the linkage are reacted through the pitch controller. For example, the track may be in the form of a groove along the outer edge of the ring member and an end of the linkage may be received in the groove, the tensile and compressive loads being reacted against the upper and lower surfaces of the groove respectively.

The guide may be located at substantially the same radial distance from the hub as the root of each rotor blade. The guide may be located at a radial distance of at least 0.5 m, and more preferably at least 1 m, from the centre of the hub. The guide is located at a radial distance of at least 10% and more preferably at least 20% of the length of the rotor blade, from the centre of the hub. By moving the pitch control away from the hub, the loads on the hub may be reduced. The loads generated by varying the pitch of the blade are preferably de-coupled completely from the hub. The mechanical complexity of the hub may be simplified thereby facilitating different configurations of the rotor assembly.

The guide may be fixed such that the linkage rotates with the rotor blades relative to the guide. Having the guide fixed and the linkage rotating in the guide, may enable the pitch controller to be simplified. The guide is preferably de-coupled from the hub. The guide may be arranged to react loads through the actuators at a radial distance away from the hub.

In an embodiment in which the rotor blades are driven at a radial distance away from the hub, the guide may be located radially outward of the radial distance at which the driver is arranged to drive the rotor blades.

As well as varying the pitch of the rotor blades, or alternatively thereto, the rotor assembly may be arranged to vary the flap angle of the rotor blades. This provides another way of varying the lift distribution of the rotor assembly and therefore also facilitates better control and maneuverability using the rotor assembly. The assembly may comprise a flap controller, the flap controller comprising a second guide and a second linkage moveable along the guide, the linkage being connected to the rotor blade such that the flap angle of the rotor blade is variable in dependence on the separation between the rotor blade and the second guide. The flap controller may comprise any of the features described above with reference to the pitch controller. It will be appreciated that the presence of the second guide and the second linkage does not necessarily mean that the first guide and first linkage of the pitch control are essential. There may be embodiments of the invention in which there is no pitch controller, and only a flap controller. The flap angle of the blade may be varied by simply bending the rotor blade, but more preferably the rotor blade comprises a hinge about which the flap angle of the rotor blade may vary.

The rotor assembly preferably comprises both a pitch controller and a flap controller. In such an embodiment the pitch controller is preferably mounted on the flap controller. For example an actuator of the pitch controller may be mounted on the second guide of the flap controller. Such an arrangement allows the pitch and flap controller to be stacked above one another and may therefore provide a relatively compact arrangement. Mounting the pitch and flap controllers on one another may avoid the need to have the controllers on opposite sides of the plane of rotation of the rotor blades (which would require especially strong mountings both below and above the rotor blades).

According to another aspect of the invention there is provided a rotor assembly comprising a plurality of rotor blades, each rotor blade comprising a blade for generating lift, the blade having a tip and a root, and a shaft extending from the root of the blade to a hub, wherein the length of the shaft is at least 10%, and more preferably 20%, of the length of the rotor blade, such that the innermost region of the rotor blade generates substantially no lift. The length of the shaft may be more than 25% of the length of the rotor blade. The shaft may be at least 0.5 m and preferably at least 1 m long. The inner region of a rotor blade generates relatively little lift in comparison to the outer regions of a rotor blade (which travel much faster). Moving the root of the rotor blade further from the hub has been found to produce a relatively small decrease in lift with the advantage that the downdraft close to the hub (which is typically in the region above the rotorcraft cabin) is significantly reduced. This, in turn, has been found to reduce the noise and vibration caused by the rotor assembly.

The above-described rotor arrangement may be incorporated in the rotor assembly according to the first, or any other aspect of the invention.

The assembly may comprise a housing. The housing may have an upper cover portion extending over the shafts of the rotor blades, the housing being fixed such that the rotor blades rotate relative to the housing. The housing may be a disc structure located above the rotor shafts. The radius of the disc structure is preferably greater than or equal to the radius at which the shaft meets the root of the rotor blade. Thus, the housing preferably covers the shafts when view directly from above.

The housing may substantially enclose the shafts of the rotor blades. The housing preferably comprises a barrier. The rotor blades preferably pass through the barrier. The assembly is preferably arranged such that the barrier substantially isolates the inside of the housing from the environment outside the housing. Such an arrangement protects the complex moving parts inside the rotor assembly from the environment outside the assembly, thereby reducing the need for maintenance and cleaning. The rotor assembly may comprise a means for maintaining a positive pressure inside the housing, relative to outside the housing.

According to a further aspect of the invention there is provided a rotor assembly comprising a plurality of rotor blades, a hub and a housing, each rotor blade comprising a blade for generating lift, the blade having a tip and a root, and a shaft extending from the root of the blade to the hub, the housing substantially enclosing the shafts of the rotor blades and further comprising a barrier such that the inside of the housing is substantially isolated from the environment outside the housing. The barrier may comprise a plurality of plates, slideably mounted relative to one another. The housing is preferably on the rotor assembly as described herein with reference to any aspect of the invention.

According to another aspect of the invention, there is provided a rotorcraft including the rotor assembly according to any aspect described herein. The rotorcraft is preferably a helicopter. The rotorcraft is preferably at least 10 kg dry weight, more preferably at least 50 kg dry weight, and yet more preferably considerably more than 50 kg dry weight. The rotorcraft is preferably suitable for carrying at least 1 person, and more preferably at least 2 persons, and yet more preferably at least 4 persons. The rotorcraft may be suitable for carrying more than 10 persons.

According to yet another aspect of the invention, there is provided a method of moving the centre of lift of a rotorcraft, the method comprising the steps of rotating a plurality of rotor blades about a hub such that the angular speed of the rotor blades about the hub, relative to one another, is varied.

It will be appreciated that any features described with reference to one aspect of the invention may be equally applicable to another aspect of the invention. For example, features describe with reference to any aspect of the rotor assembly may be equally applicable to the method of the invention.

DESCRIPTION OF THE DRAWINGS

Various embodiments of the invention will now be described, by way of example only, with reference to the accompanying schematic drawings of which:

FIGS. 15a and 15b are views of the part of the rotor assembly of FIG. 13 in two different configurations.

DETAILED DESCRIPTION

Figure 1:
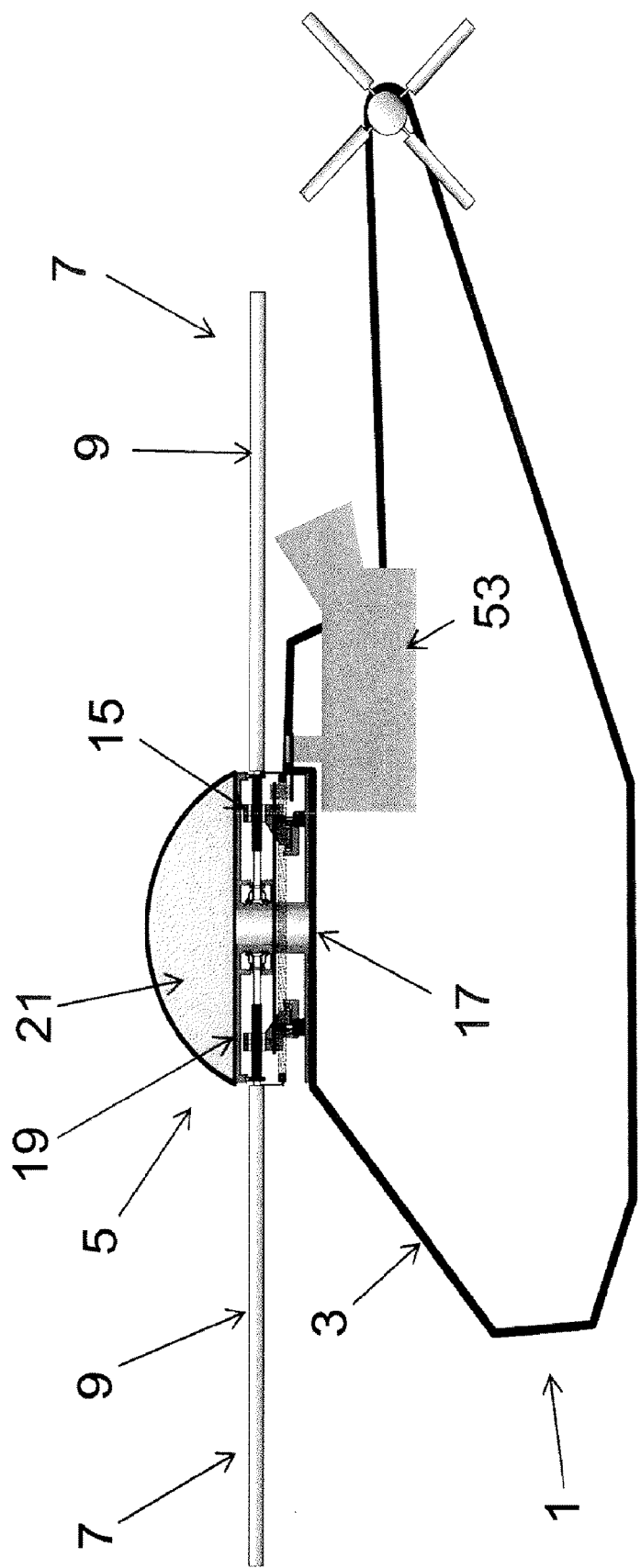
FIG. 1 is schematic side view of a helicopter according to a first embodiment of the invention.
Figure 2:
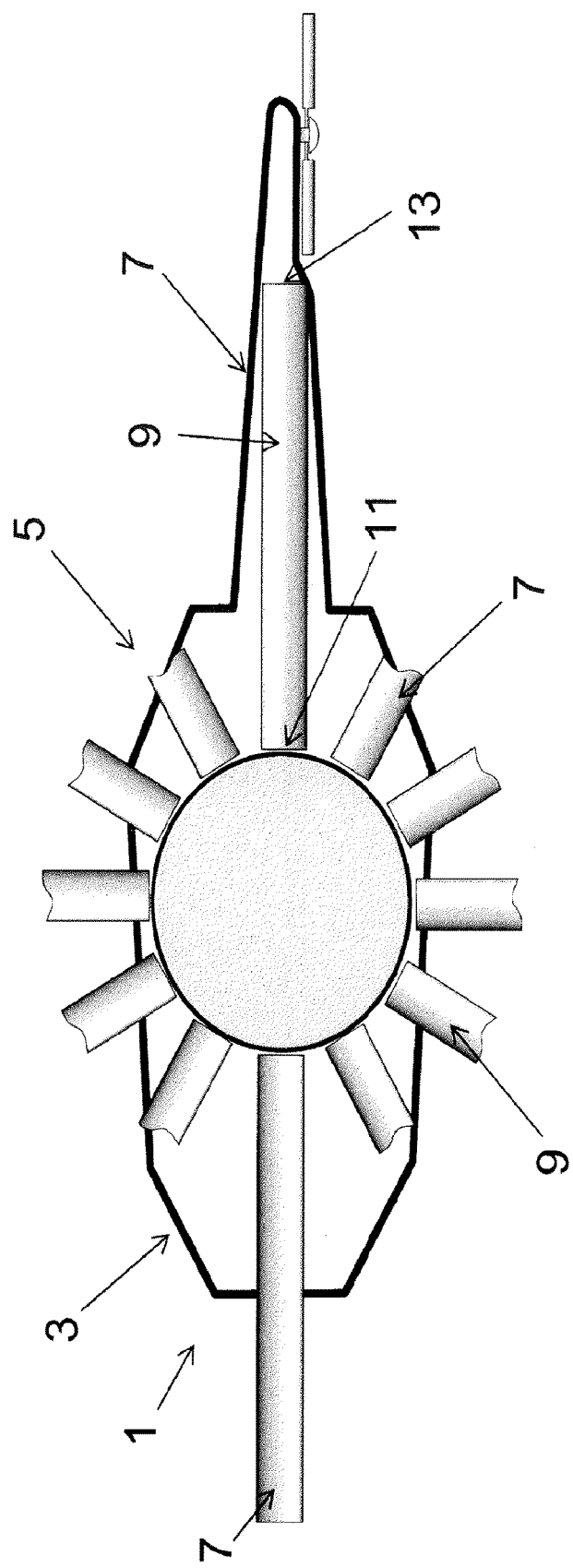
FIG. 2 is a schematic plan view of the helicopter of FIG. 1.

According to a first embodiment of the invention, a helicopter 1 comprises a fuselage 3 and a rotor assembly 5 mounted on the top of the fuselage 3. The rotor assembly carries twelve rotor blades 7, each rotor blade 7 comprising a 3 m long blade 9 having an aerofoil section (the full length of only the forward and aft rotor blades is shown in FIG. 2, only the inner region of the other rotor blades being shown). The blade 9 extends from a root 11 to a tip 13. For the sake of clarity, each blade 9 is shown having a uniform chord and zero twist/washout. In practice, the chord and twist of the blade 9 vary along the length of the blade as is well known in the art. A 1 m long shaft 15, aligned with the centre of lift of the blade 9, extends from the root 11 of the blade to a hub 17. The rotor assembly 5 comprises a disc-shaped cover portion 19 which is fixedly attached to the top of the hub 17. The cover portion extends outwardly to the root 11 of the rotor blades 7. A dome-shaped cowling 21 is attached to the top of the cover portion 19.

Figure 3:
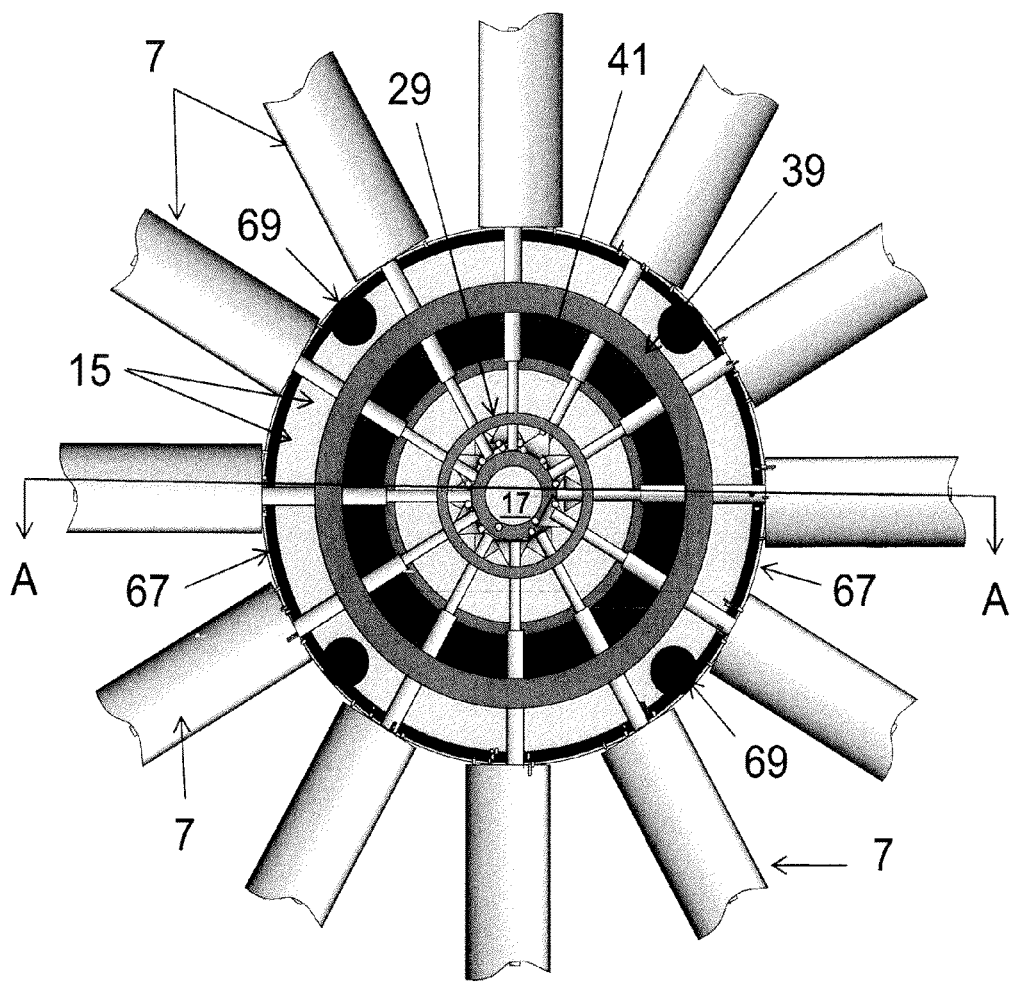
FIG. 3 is a plan view of the rotor assembly on the helicopter of the first embodiment of the invention.
Figure 4:
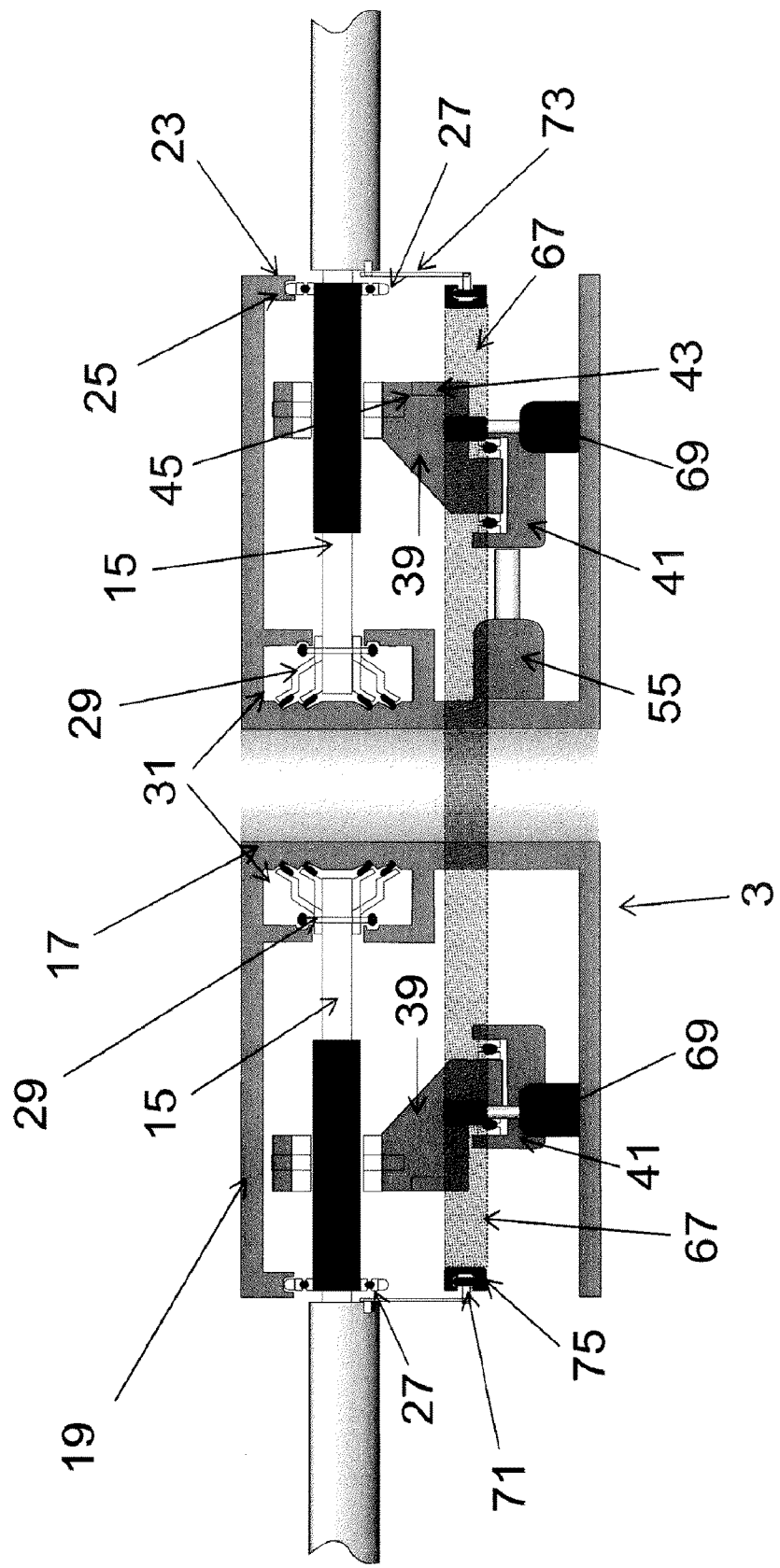
FIG. 4 is a section view through the line A-A in FIG. 3.

The rotor assembly 5 is shown in more detail in FIG. 3 (a plan view of the rotor assembly with the cover portion 19 removed) and FIG. 4 (a sectional view along the line A-A of FIG. 3). Referring to FIGS. 3 and 4, the twelve rotor blades 7 are rotatable about the central hub 17. The hub 17 is fixedly mounted on the helicopter fuselage 3.

The cover portion 19 extending out from the top of the hub 17 has a lip 23 extending downwardly from its circumference and the lip 23 has a semi-circular groove 25 in its underside. A free-coasting wheel 27 is positioned on the shaft of each rotor blade close to the junction of the shaft 15 and blade root 11. The wheel 27 is arranged to run in the groove 25. In this manner much of the lift force from each rotor blade 7 is transmitted to the cover portion 19 and hence to the helicopter fuselage 3.

The free end of each shaft 15 is held in a mounting trolley 29 which is, in turn, received in a circumferential track 31 extending round the hub. Each trolley 29, and hence each rotor blade 7, is freely rotatable around the fixed hub 17. This is in contrast to conventional rotorcraft rotor assemblies, where the rotor blades are typically fixed to the hub and the hub is rotatably driven.

Figure 5:
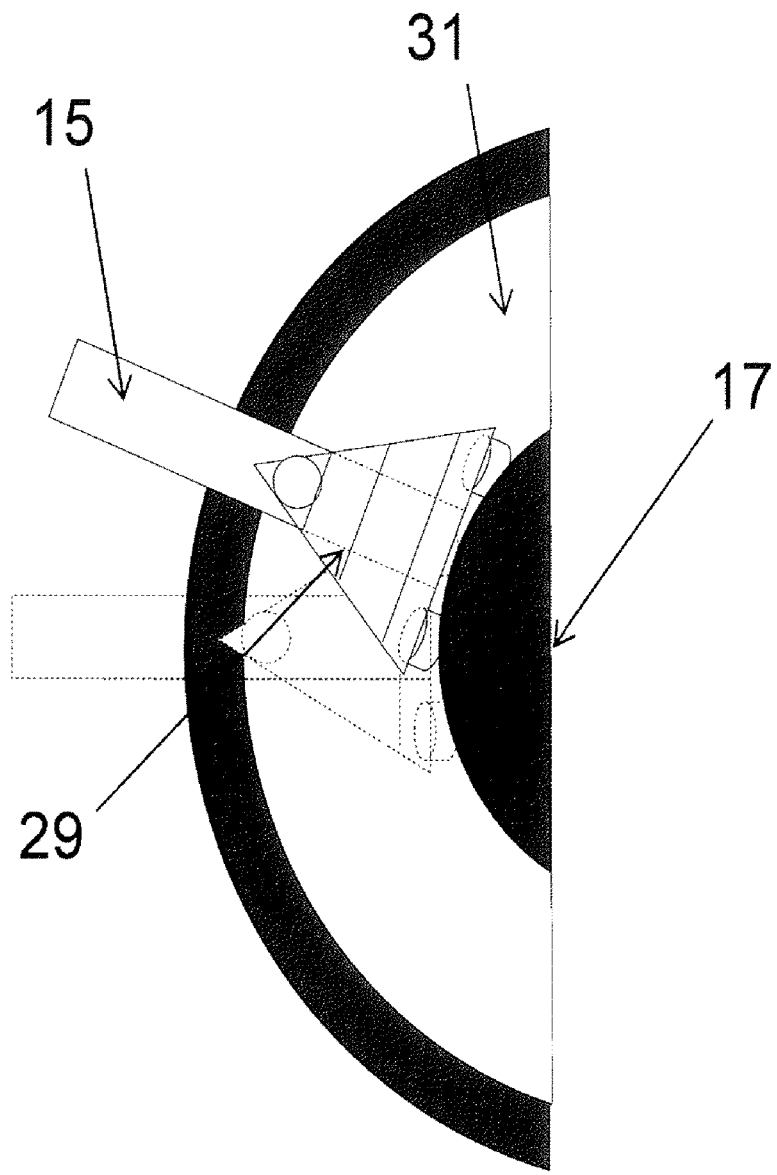
FIG. 5 is a partial plan view of the rotor assembly of FIG. 3.
Figure 6A:
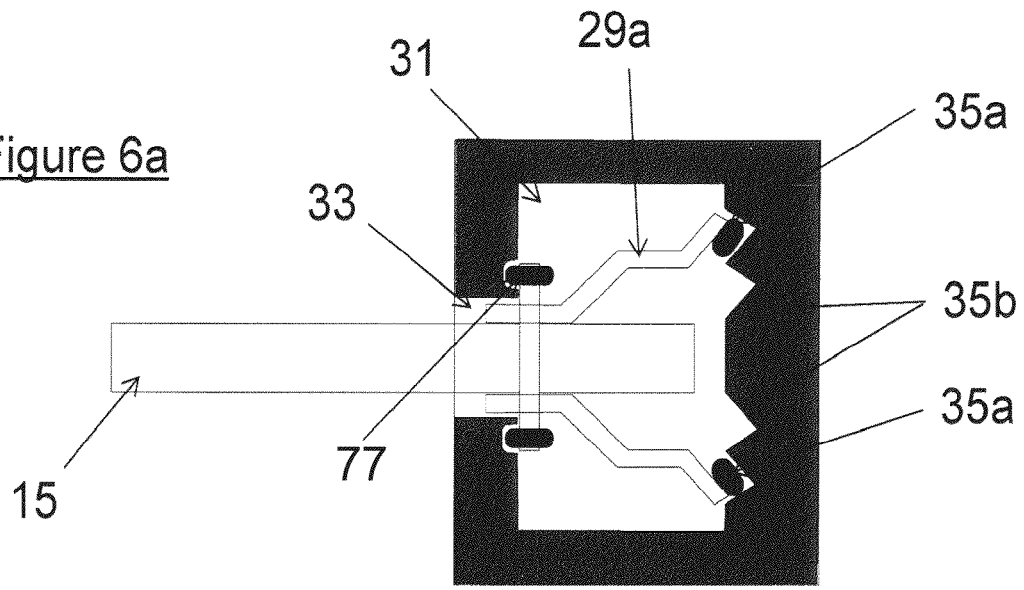
FIGS. 6a and 6b are sectional view of the rotor blade mounting trolleys in the rotor assembly of FIG. 3.
Figure 6B:
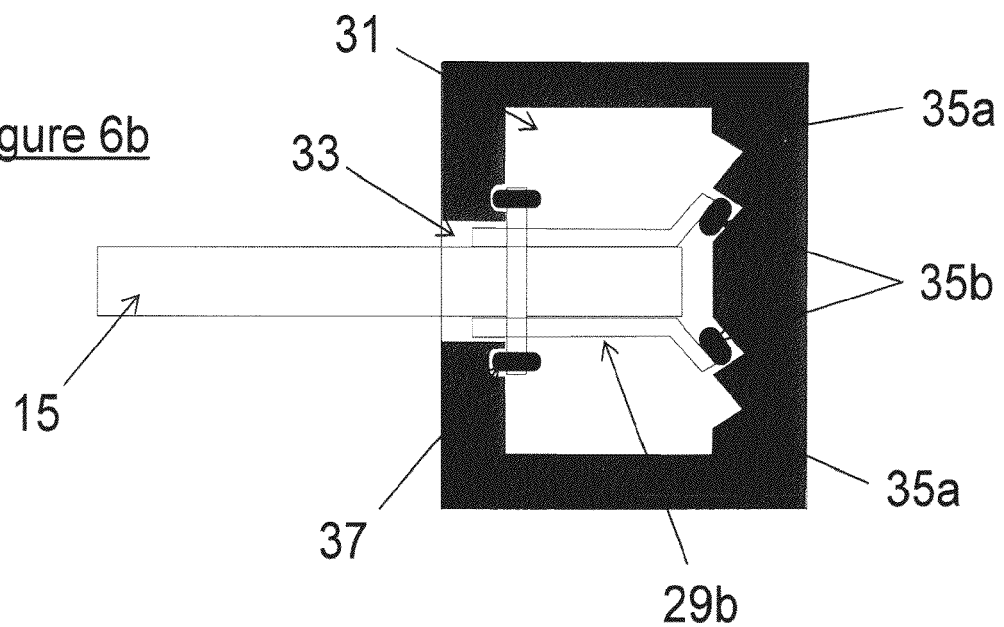

In order to allow a plurality of rotor blades to rotate about the same fixed hub, various different mechanisms can be employed. The hub 17 and track 31 arrangement of the first embodiment of the invention will now be described in more detail: Referring to FIG. 5 and FIGS. 6a and 6b, the hub 17 comprises a circumferential track 31 with an opening 33 through which the shaft 15 extends. Radially innermost in the track 31, there is an outer pair of circumferentially extending notches 35a and an inner pair of circumferentially extending notches 35b. Radially outermost in the track 31 there are a single pair of semi-circular circumferential grooves 37.

The assembly comprises two types of mounting trolley 29a and 29b. Each type of mounting trolley 29a, 29b is positioned adjacent to one of the other type. Each trolley comprises a set of wheels 77 received in the pair of semi-circular circumferential grooves 37, but the different types of trolley have wheels in the outer 35a and inner 35b pairs of notches respectively. Thus the trolley 29a for the outer notches 35a has a generally wedge-shaped support structure whereas the trolley 29b for the inner notches 35b has a generally box-shaped support structure. The box-shaped support structure can be at least partially received in the wedge-shaped support structure and thus the adjacent mounting trolleys 29a and 29b are operable to overlap around the circumference of the hub 17 (the benefits of which are discussed later). In addition, the arrangement in the first embodiment of the invention can sustain significant rotational and lift forces.

As discussed above, the rotor blades 7 are freely rotatable around the fixed hub 17. In the first embodiment of the invention, the rotor blades 7 are driven by applying a driving force at a radial distance along the shaft 15, close to the root 11 of the blade 9. To drive the rotor blades 7 in this fashion, the assembly 5 comprises a drive ring 39.

Figure 7:
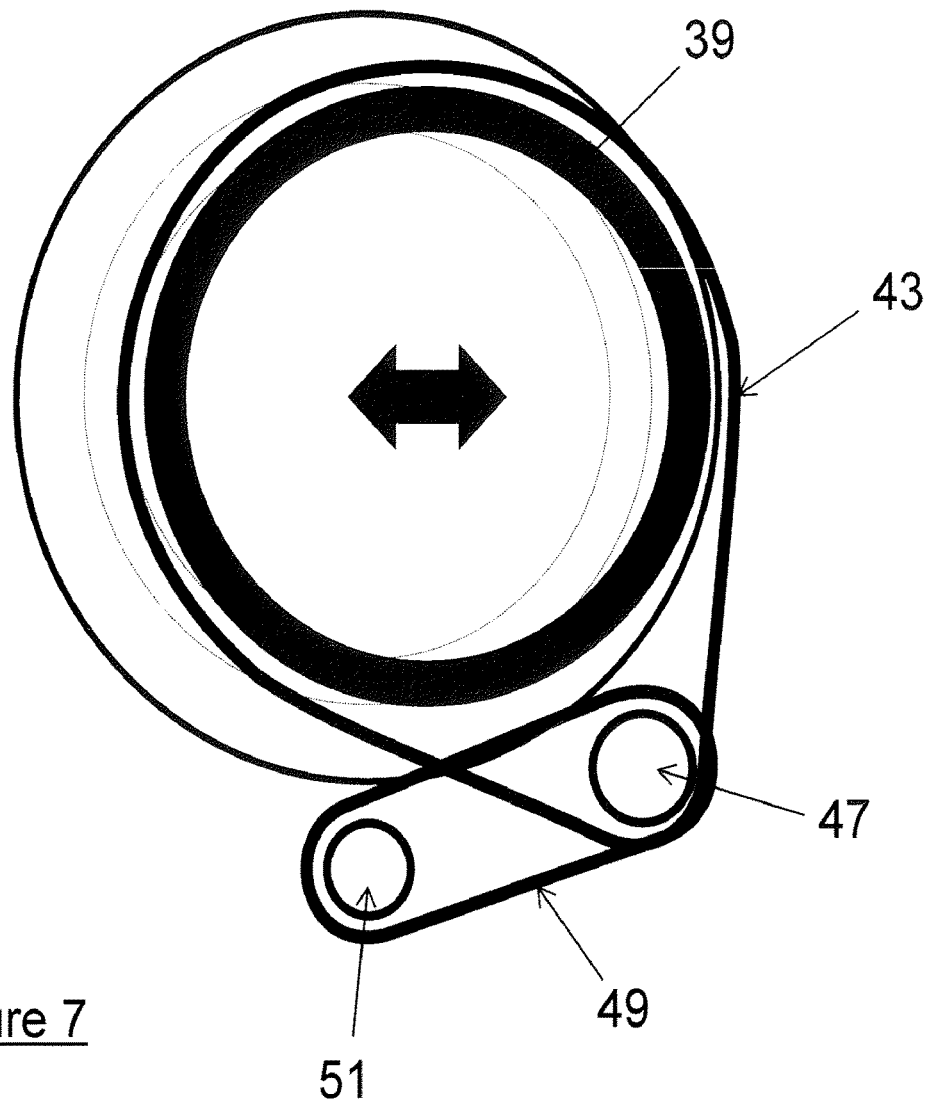
FIG. 7 is a schematic plan view of the rotor assembly of FIG. 3 showing a driver for driving the drive ring.

Referring back to FIGS. 3 and 4, the drive ring 39 is received in, and is freely rotatable in, a circular track 41 fixed to the top of the helicopter fuselage 3. The mechanism for driving the drive ring 39 is not shown in FIGS. 3 and 4 for the sake of clarity. Instead, FIG. 7 shows the drive mechanism by way of a schematic plan view of the rotor assembly 5. The drive ring 39 is rotated by way of a belt 43 engaging a groove 45 in the outer edge of the drive ring 39, the belt 43 also passing round a roller 47, which is in turn driven by a second belt 49 engaged with the output shaft 51 of an engine 53. By driving the rotor blades 7 by the drive ring 39, thereby applying a drive force at a radial distance from the hub, the rotor assembly 5 is able to withstand a relatively large torque (in comparison to an arrangement in which the rotor blades 7 are fixed to a rotating hub). This enables a large torque to be safely applied and enables the rotor blades 7 to be rapidly accelerated.

This belt drive arrangement enables the drive ring 39 to be rotated even when it is laterally repositioned. FIG. 7 shows the drive ring 39 laterally repositioned to the right and lateral movement of the ring is indicated by the double-headed arrow. The mechanism for laterally moving the drive ring 39, and its effects, are described below.

Figure 8:
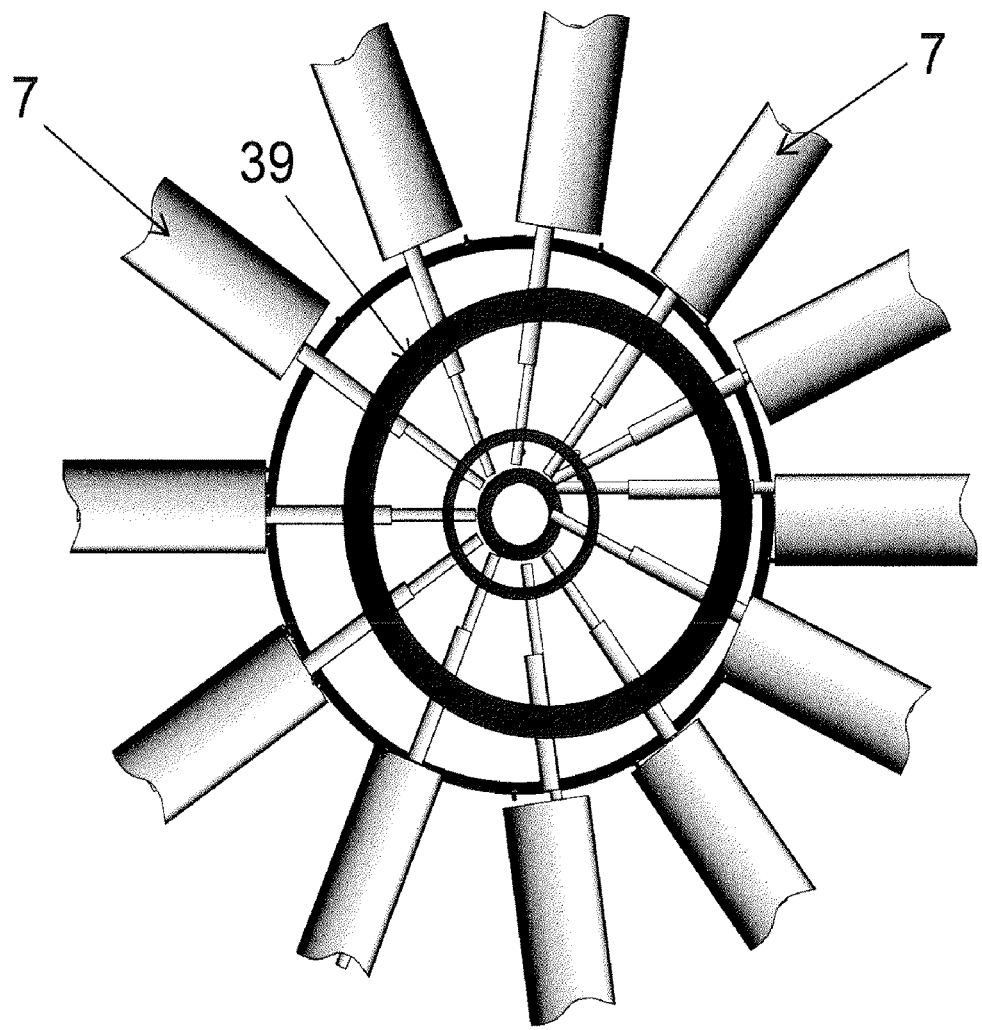
FIG. 8 is a plan view of the rotor assembly of FIG. 3 with the drive ring laterally shifted to one side.

The circular track 41 in which the drive ring 39 is received is moveable laterally by way of a hydraulic actuators 55 fixedly mounted on the hub 17 (the actuator is not shown in FIG. 3 for clarity). At maximum extension, the actuator 55 positions the track 41, and hence the drive ring 39, over the far right-hand side of the assembly. FIG. 8 is a schematic plan view of the rotor assembly showing the drive ring 39 at close to maximum displacement to the right-hand side.

Figure 9:
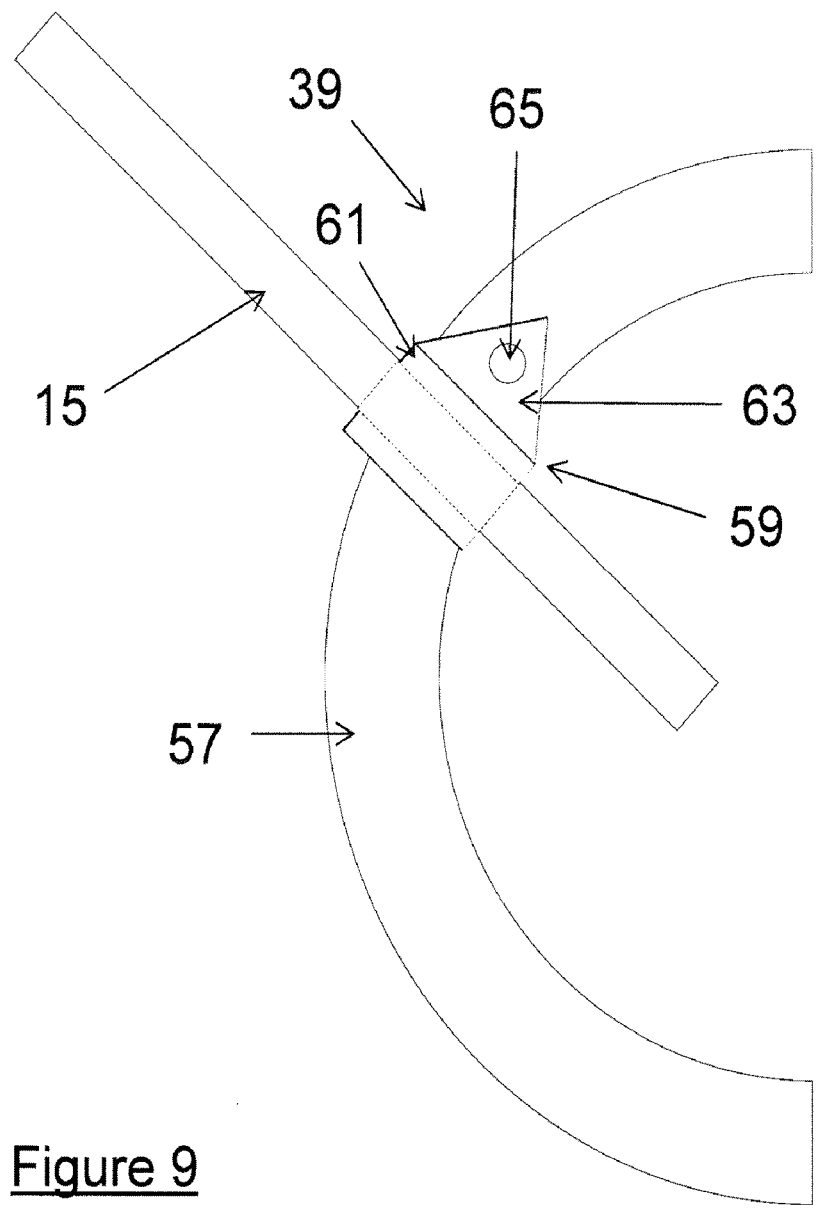
FIG. 9 is a partial plan view of the drive ring in the rotor assembly of FIG. 3.

The structure of part of the drive ring 39 is shown in more detail in FIG. 9. The drive ring 39 comprises a ring-shaped base portion 57 on which twelve sleeves 59 are pivotably mounted. For the sake of clarity, FIG. 9 only shows one half of the drive ring and only one of the sleeves. Each sleeve 59 comprises hollow tube portion 61. The tube portion 61 is connected to a protruding flange 63 through which a vertical spindle 65 passes. The spindle 65 defines an axis that is parallel to the axis of rotation of the drive ring 39. The shaft 15 of a rotor blade 7 passes through each respective sleeve 59 and is slideably received therein. Relative movement between the rotor blade 7 and drive ring 39 along the length of each rotor blade 7 is therefore enabled, but circumferential movement between the rotor blade 7 and drive ring 39 at the point the rotor blade 7 passes through, and is coupled to, the circumference drive ring 39, is prevented.

Figure 10:
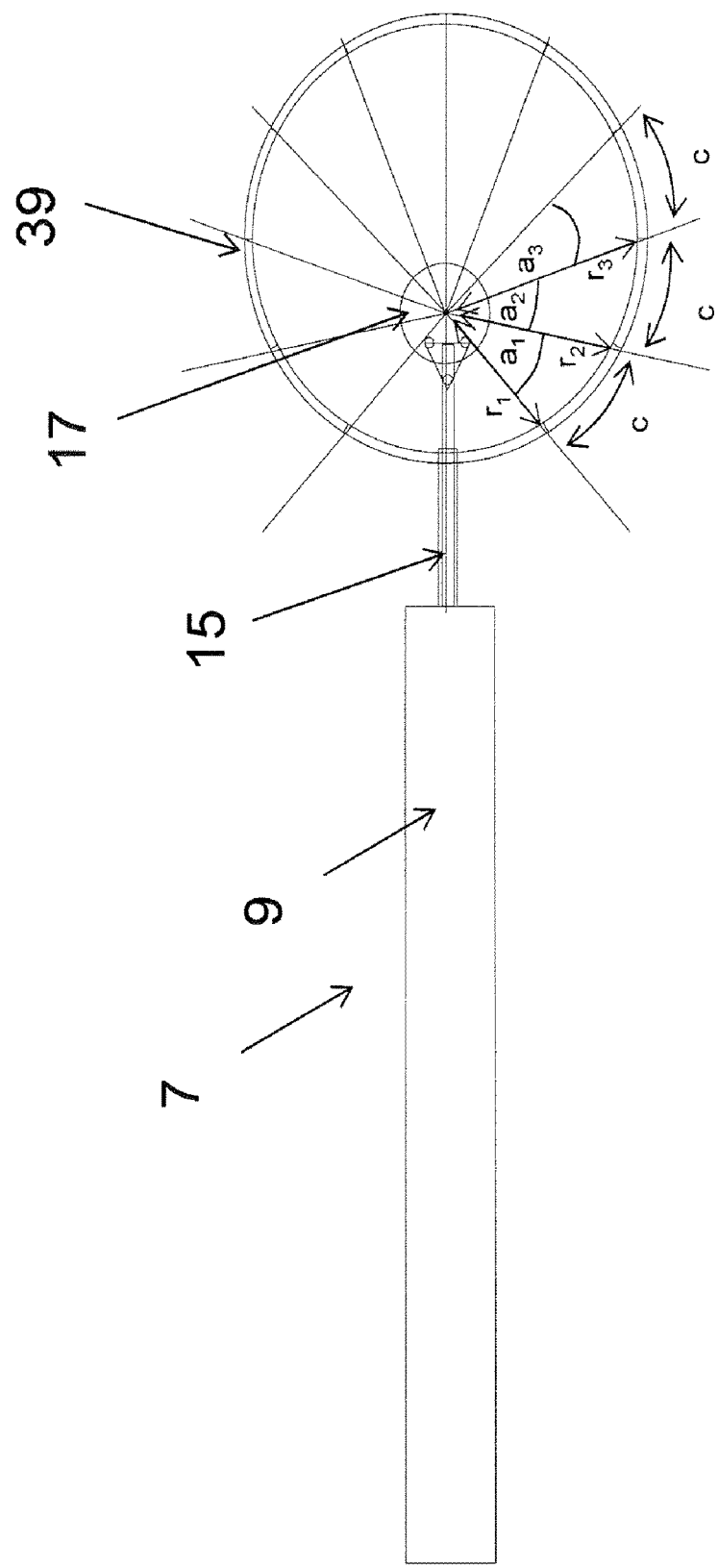
FIG. 10 is a schematic plan view of the rotor assembly of FIG. 3 showing the variable spacing of the rotor blades.

FIG. 10 is a highly schematic plan view of the rotor assembly 5 showing how the rotor blades 7 are arranged when the drive ring 39 has been laterally shifted to the right. As explained above with reference to FIG. 9, the circumferential spacing (c) of the rotor blades 7 around the drive ring 39 is fixed, but the rotor blades 7 are arranged such that they are slideably moveable along their length relative to the drive ring 39. This means the angular spacing (a1, a2 and a3) is varied when the drive ring 39 is moved laterally.

When the drive ring 39 and the hub 17 are co-axial, the shafts 15 of the rotor blades 7 all pass through the sleeves 59 on the drive ring 39 at the same radius. In this case, when the drive ring 39 is driven at a constant angular speed, all the rotor blades 7 rotate at this same angular speed. When the drive ring 39 is laterally repositioned (for example to the right of the hub as shown in FIG. 10), the angular speed of each point on the drive ring 39 is still constant, but that angular speed occurs at a different radius r1, r2 and r3 (from the hub) along each rotor blade 7. In the example shown in FIG. 10, the radius at which each rotor blade 7 is being driven is greater on the right-hand side than the left-hand side. The rotational speed of each rotor blade 7 therefore varies throughout one revolution of the blades. In the schematic diagram shown in FIG. 10 the radius of the drive ring is 0.75 m and the offset from the axis of the hub is 0.25 m. The drive ring 39 is rotating at an angular speed of $\Omega$. The tangential local speed of the left-hand rotor blade 7 at the point at which it passes through the drive ring 39 must be equal to the tangential local speed of the right-hand rotor blade 7 at the point at which it passes through the drive ring 39 as circumferential spacing of the rotor blades 7 at these points is fixed. In the example in FIG. 10, both those speeds are equal to $0.75*\Omega$. However, the rotor blades 7 are rotating around the hub, and are therefore being driven at different radii. The angular speed of the left-hand rotor blade 7 is therefore $0.75*\Omega/(0.75-0.25)=1.5\Omega$, whereas the angular speed of the right-hand rotor blade 7 is $0.75*\Omega/(0.75+0.25)=0.75\Omega$. The angular speed of each rotor blade 7 is therefore different. In the above-mentioned example, the rotor blade 7 is driven at 430 rpm, and the rotor assembly is arranged to compensate for a forward speed of around 150 mph without needing to resort to pitch control. In the first embodiment of the invention, the angular speed of the rotor blades 7 varies sinusoidally within each revolution of the drive ring. The maximum speed differential between the rotor blades 7 occurs between rotor blades 7 on opposing sides of the hub in a direction that is parallel to the direction of the lateral shift of the drive ring.

By laterally moving the drive ring to one side, the retreating rotor blades 7 can be rotated faster than the advancing rotor blades 7. This can offset any difference in relative airspeed caused by forward motion of the rotorcraft, and therefore increases the maximum forward speed of the rotorcraft and reduces the need for pitch control of the advancing/retreating blades.

When the drive ring 39 is moved laterally, the rotor assembly 5 is subjected to significant inertial loads. To reduce rotational speed at which the rotor assembly operated (and therefore the inertial loads), the rotor assembly 5 is provided with a relative high number of rotor blades 7 (twelve in the first embodiment of the invention). Furthermore the rotor blades 7 are relatively short (approximately 4 m, with a 3 m blade) and light.

Although the ability to vary the relative speed of the rotor blades 7 may reduce the need to have a pitch control, in a preferred embodiment the rotor assembly 5 still comprises a pitch control mechanism. Referring back to FIGS. 3 and 4, the rotor assembly 5 comprises a pitch control guide ring 67 mounted on four equally spaced hydraulic actuators 69. The ring 67 is concentric with the hub 17, and when all the actuators 69 are at the same height the ring 67 is level (relative to the fuselage 3 of the rotorcraft 1) and co-axial with the hub 17. The actuators 69 are independently controllable to change the total elevation and/or the angle of the guide ring 67. The pitch control guide ring 67 comprises a circumferential channel 71 passing around the outer edge of the ring 67.

A pitch control linkage 73 is connected, at one end, to the trailing edge of the blades 9. The other end of the linkage 73 includes a rotatable wheel 75 located in the channel 71 passing around the circumference of the guide ring 67. As the rotor blades 7 rotate, the wheel 75 on the end of the linkage 73 is pulled around the channel 71. When the guide ring 67 is horizontal relative to the hub 17 (i.e. is generally in the plane of rotation of the rotor blades 7), the pitch of all the blades 9 is equal throughout one revolution of the rotor assembly. However, when the angle of the guide ring 67 is altered, the pitch control linkage 73 pushes or pulls the trailing edge of the blade up or down as it passes round the guide ring 67 thereby altering the pitch (i.e. angle of attack) of each blade 9 as it passes through one revolution.

In the first embodiment of the invention, the pitch control linkage 73 is located around 1 m from the axis of rotation of the rotor blades 7. This is in contrast to known rotor assemblies where the pitch control mechanism tends to be located on, or very close to, the hub of the rotor assembly. By positioning the pitch control away from the hub, the mechanical complexity of the hub is reduced. The loads to which the hub 17 is subjected are also reduced because at least some component of the lift may be transmitted to the helicopter fuselage via the guide ring 67 (located well away from the hub) and the hydraulic actuators 69 to which it is attached.

The helicopter of the first embodiment of the invention has twelve rotor blades 7, which is more than a typical helicopter (which tend to have between 2 and 4 rotor blades 7). Due to the greater number of rotor blades 7, the blade length can be reduced relative to a typical helicopter, without decreasing the lift at a given rotational speed. As discussed above, each rotor blade 7 comprises a relatively long shaft 15 extending from the hub 17 to the root 11 of the blade 9. This shaft 15 is of circular cross section and does not generate a significant, if any, amount of lift. The downdraft in the region of the hub 17 is therefore reduced relative to arrangements in which the blade 9 extends close to the hub 17. This has been found to reduce the operating noise of the rotor assembly in the cabin of the helicopter which is positioned below the rotor assembly.

Figure 11:
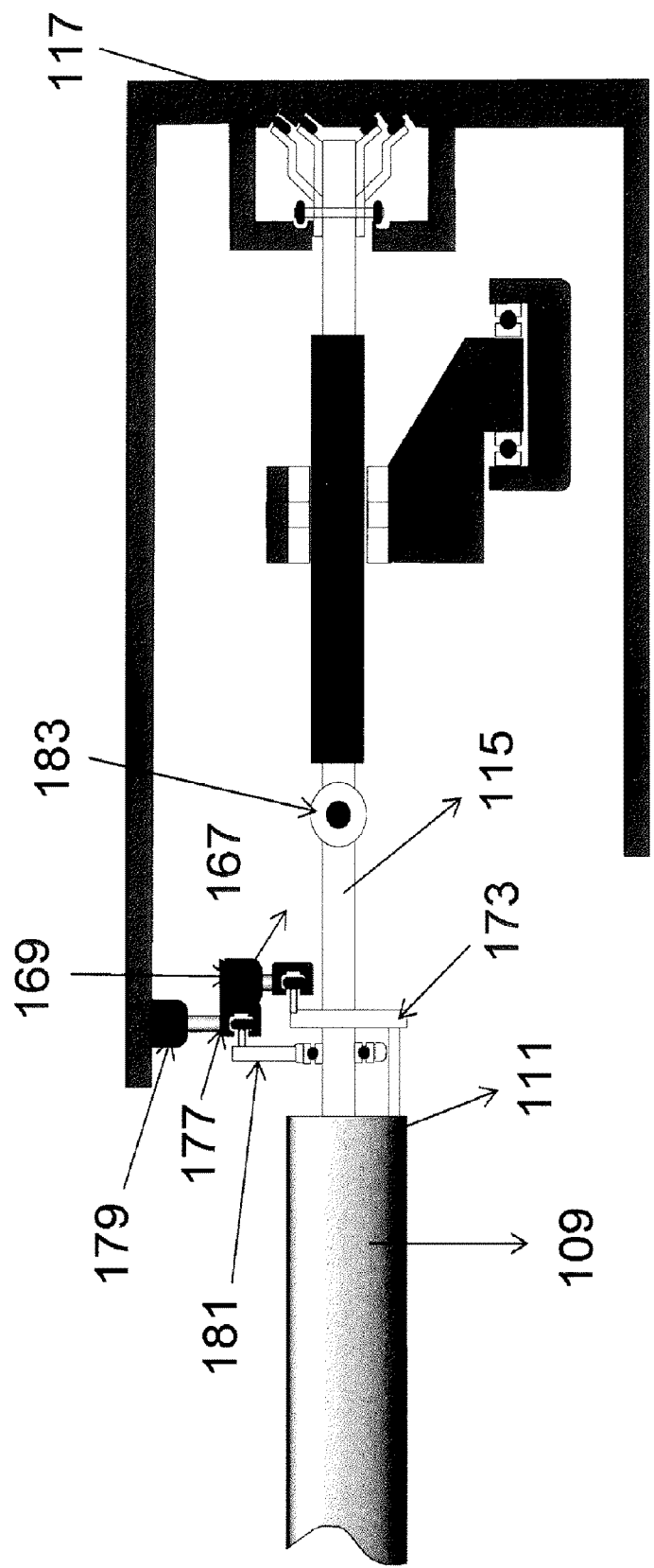
FIG. 11 is a sectional view of part of a rotor assembly according to a second embodiment of the invention.
Figure 12:
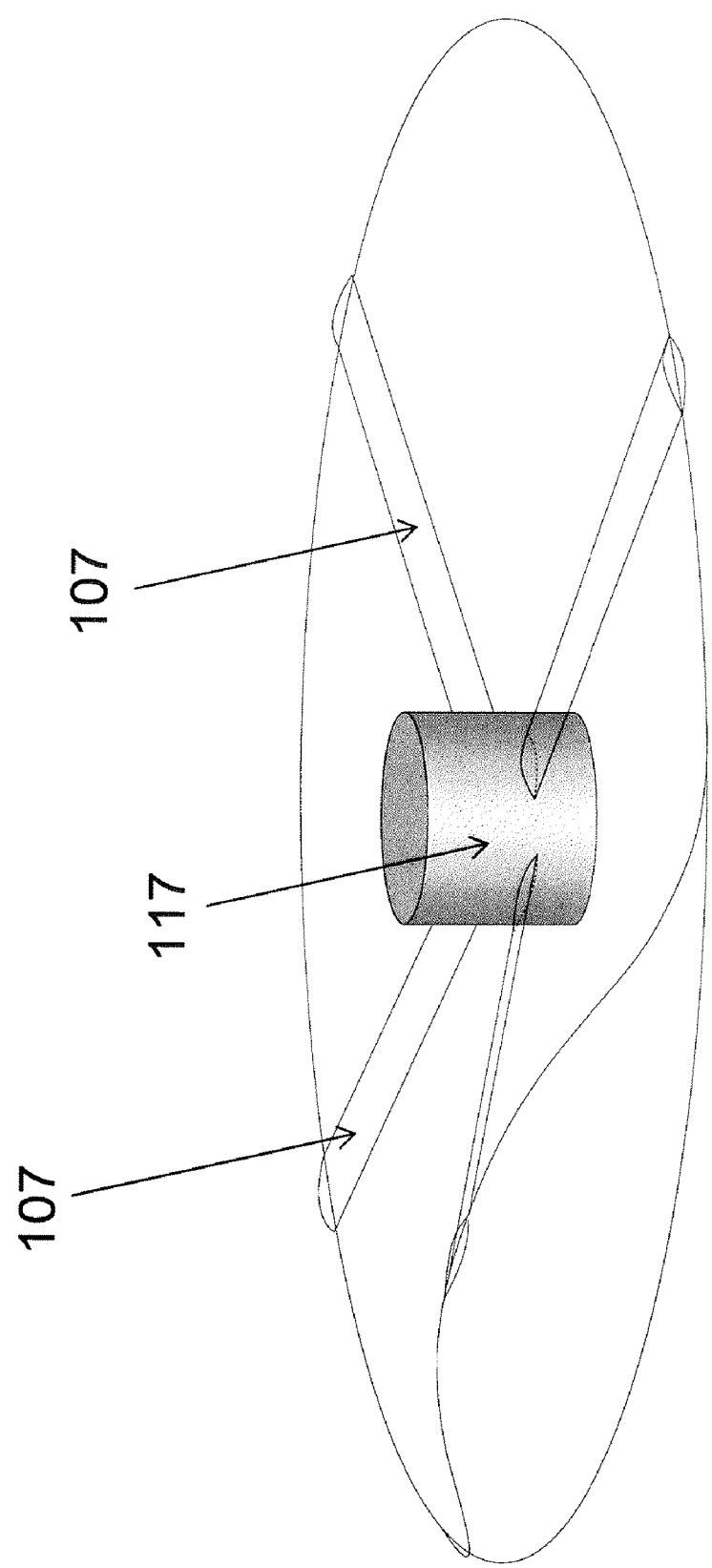
FIG. 12 is a perspective view of the rotor assembly of FIG. 11.

FIGS. 11 and 12 show a second embodiment of the invention. The second embodiment of the invention is generally the same as the first embodiment except for the differences described below. The equivalent features are numbered with the same reference numerals except for a prefix of 1, or 10 as appropriate. According to the second embodiment, the rotor assembly comprises a flap controller and a pitch controller. The pitch controller is arranged in similar manner to that in the first embodiment of the invention, except that the pitch guide ring 167 is located above the blade and the actuators 169 are not attached to the fuselage. Instead, the actuators 169 are mounted on a second guide ring 177 which is part of a flap controller.

The flap controller comprises the flap guide ring 177 attached to the flap actuators 179. A linkage 181 links the flap guide ring 177 to the shaft of each rotor blade 107 at a position close to the root 111 of the blade 109, and radially outward of a flap hinge 183. The linkage 181 is moveable around the circumference of the guide ring 179 as the rotor blades 107 rotate about the hub. To change the flap angle of the rotor blades the actuators 179 move the guide ring 177 up or down as appropriate. This changes the separation between the guide ring 177 and the shaft 115, causing the rotor blade 107 to rotate about the hinge 183.

The rotor assembly of the second embodiment of the invention comprises only four rotor blades 107 rotatable about the fixed hub 117. FIG. 12 is a perspective view of the rotor assembly showing an arrangement in which the flap angle on one side of the rotor assembly is increased. By increasing the flap angle, a lateral thrust is generated over this side of the rotor assembly. The flap controller may therefore be used to manoeuvre the rotorcraft. Of course, the second embodiment of the invention also allows independent or complimentary pitch control via the pitch controller. If it is desirable to keep the pitch constant, whilst varying the flap angle, the flap actuator 179 and the pitch actuator 169 are controlled such that there is no net movement of the pitch linkage 173.

Figure 13:
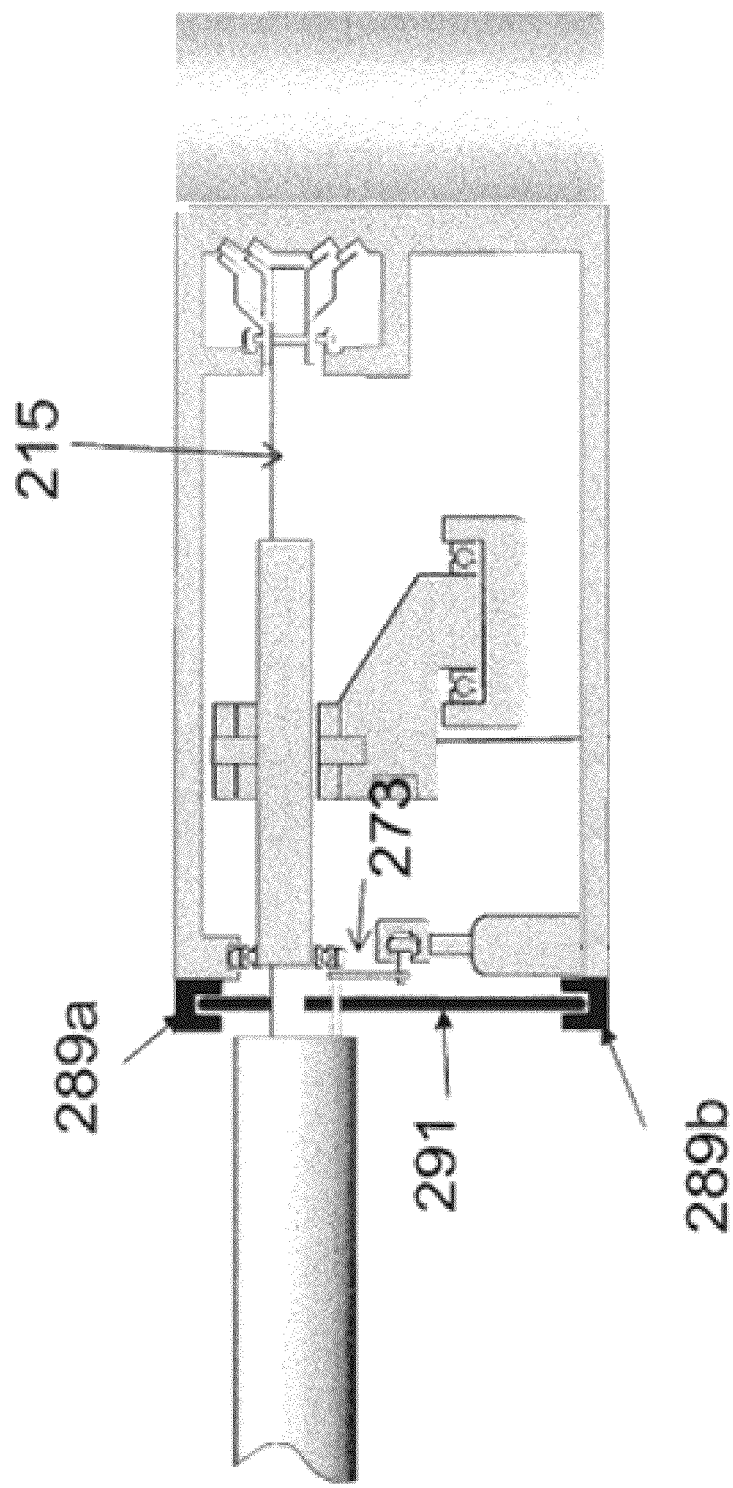
FIG. 13 is a sectional view of part of a rotor assembly according to a third embodiment of the invention.

FIG. 13 is a close up view of part of a rotor assembly according to a third embodiment of the invention. The rotor assembly is generally the same as the first embodiment except for the differences described below. The equivalent features are numbered with the same reference numerals except for a prefix of 2, or 20 as appropriate.

Upper and lower support surfaces 289a and 289b are located at the outer circumference of the rotor assembly housing. The support surfaces have opposing grooves for receiving the upper and lower lengths of a circumferential plate 291. The plate 291 is made of flexible plastic and is constrained within the grooves such that the plate curves around with the circumference of the housing.

Figure 14:
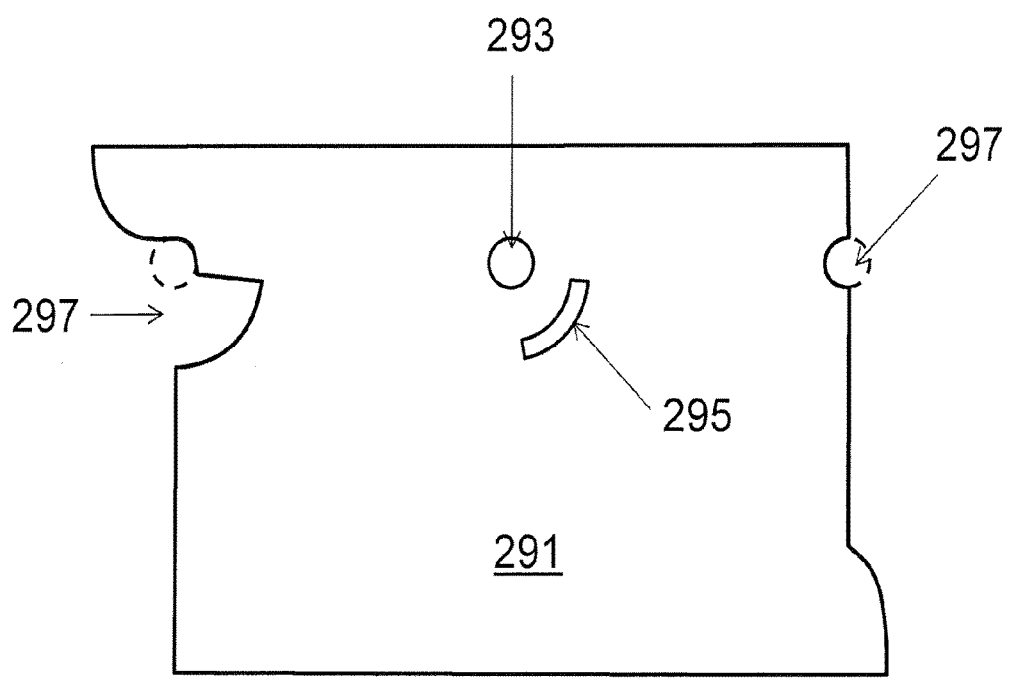
FIG. 14 is a view of part of the rotor assembly of FIG. 13.

FIG. 14 shows a side view of the plate (the plate is shown as being flat for the sake of clarity). The plate 291 includes a hole 293 through which the shaft 215 of the rotor passes. A curved slot 295 is also cut-out below the hole 293 to accommodate the pitch linkage 273. Each end of the plate comprises further cut-outs 297 to accommodate the shaft 215 and/or pitch linkage of adjacent rotor blades 107.

As the rotor blade 107 passes through the hole 293 the rotation of the rotor blade 107 pulls the plate about the circular path between the two grooves 289a, 289b. The spacing between the hole 293 and the cut-outs 297 on either side of the plate is such that when adjacent rotor blades 107 are at their closest, the adjacent shafts 215 are received in the cut-outs 297 of the central plate, and the shaft 215 of the central plate is received in the cut-outs 297 of the adjacent plates (as shown in FIG. 15a). The spacing is also such that when adjacent rotor blades 107 are at their furthest apart, the adjacent rotor blades 107 are received in only the cut-outs of the central plate (see FIG. 15b). In this embodiment of the invention, the ratio between the smallest and greatest separation is 2:1. This is the maximum variation that can work with a single sliding plate per blade, but for larger ratios, further plates may be provided.

As demonstrated in FIGS. 15a and 15b, there is always a degree of overlap between adjacent plates. This maintains a barrier between the inside of the rotor assembly and the outside environment. The hub, drive and pitch mechanisms are therefore protected, to some degree, from hostile operating environments outside the rotor assembly.

In a further embodiment, that is a variation on the third embodiment, the rotor assembly further comprises a filtered air duct for ducting air flow into the region within the plates. A positive pressure is therefore established in the chamber that further reduces the exposure of moving parts to the outside environment.

According to another embodiment (not shown), the rotor assembly comprises two perpendicular actuators for moving the drive ring. At maximum extension the left/right actuator positions the drive ring as described with reference to the first embodiment. At maximum contraction, the left/right actuator positions the drive ring over the far left-hand side of the assembly. A front/back actuator is operable to position the drive ring forward or aft of the hub centre. Of course, a combination of front/back and left/right positioning on the ring is also possible. It will be appreciated that a lateral movement is any movement in any direction within the horizontal plane containing the drive ring. The above-mentioned arrangement is especially useful for varying the rotor blade speed in order to manoeuvre the rotorcraft. For example, by increasing the speed of rotor blades on the left-hand side, the net lift force moves to the left, causing the helicopter to bank right. By way of another example, the drive ring may be moved laterally to the front of the rotor assembly, thereby increasing the speed and the lift on the rear rotor blades, causing the helicopter to pitch forward.

Whilst the present invention has been described and illustrated with reference to particular embodiments, it will be appreciated by those of ordinary skill in the art that the invention lends itself to many different variations not specifically illustrated herein. For example, in a further embodiment, a rotor assembly comprises a set of rotor blades fixedly attached to a rotatable hub and the rotor assembly comprises the pitch control mechanism substantially as described herein with reference to the first embodiment. In another embodiment of the invention the assembly comprises a plurality of independently controllable motors for moving the rotor blades around the hub. The angular speed of the erotor blades around the hub, relative to one another can be varied by independently controlling the speed of the different motors. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A rotor assembly for a rotorcraft, the rotor assembly comprising a plurality of rotor blades rotatable about a hub and a driver, the driver being operable to drive each of the plurality of rotor blades at a different radial distance from the hub;
wherein the rotor assembly is arranged such that tangential speed of each of the plurality of rotor blades at each radial distance is equal, and the rotor assembly is operable to vary angular speed of the plurality of rotor blades about the hub, relative to one another.

2. An assembly according to claim 1, wherein the driver comprises a rotatably driven drive ring, the plurality of rotor blades being coupled to the circumference of the drive ring.

3. An assembly according to claim 2, wherein the drive ring is laterally moveable relative to the hub, such that the drive ring is operable to drive each of the plurality of rotor blades at a different radial distance from the hub.

4. An assembly according to claim 3, wherein the plurality of rotor blades are slideably moveable through a circumference of the drive ring in a direction along a length of each of the plurality of rotor blades, such that lateral movement of the drive ring alters the angular spacing of each of the plurality of rotor blades.

5. An assembly according to claim 1, wherein each of the plurality of rotor blades is mounted on the hub via a mounting, the driver being arranged to drive each of the plurality of rotor blades at a location radially outward of the mounting.

6. An assembly according to claim 5 wherein the mounting is slideably moveable around the circumference of the hub.

7. An assembly according to claim 1, wherein each of the plurality of rotor blades comprises a blade having a tip and a root, and a shaft extending from the root of the blade to the hub, wherein the assembly further comprises a pitch controller for varying pitch of the blade, the pitch controller comprising a guide and a linkage moveable along the guide, the linkage being connected to each of the plurality of rotor blades such that the pitch of the blade is variable in dependence on separation between each of the plurality of rotor blades and the guide.

8. An assembly according to claim 7, wherein the pitch controller further comprises a plurality of independently actuatable actuators arranged to vary the separation between the plurality of rotor blades and the guide.

9. An assembly according to claim 7, wherein the guide is flexible such that the guide is deformable from a planar configuration to a non-planar configuration.

10. An assembly according to claim 7, wherein the linkage is arranged in relation to the guide such that both tensile and compressive loads in the linkage are reacted through the pitch controller.

11. An assembly according to claim 7, wherein the guide is fixed such that the linkage rotates with the plurality of rotor blades relative to the guide.

12. An assembly according to claim 7, further comprising a flap controller, the flap controller comprising a second guide and a second linkage moveable along the guide, the linkage being connected to the plurality of rotor blades such that a flap angle of the blade is variable in dependence on the separation between the plurality of rotor blades and the second guide.

13. A rotorcraft comprising the rotor assembly according to claim 1.

14. An assembly according to claim 1, wherein the hub is fixed such that the plurality of rotor blades are rotatable about, and relative to, the fixed hub.

15. A method of moving the centre of lift of a rotorcraft, the method comprising the steps of driving a plurality of rotor blades at different radial distances from a hub, wherein a tangential speed of each of the plurality of rotor blades at each radial distance is equal, and wherein an angular speed of each of the plurality of rotor blades about the hub, relative to one another, is varied.

16. A rotor assembly for a rotorcraft, the assembly comprising a plurality of rotor blades moveable along a track around the circumference of a fixed hub such that the plurality of rotor blades are rotatable around the hub, the rotor assembly comprising a driver that is operable to drive the plurality of rotor blades at different radial distances from the hub such that a tangential speed of each of the plurality of rotor blades at each radial distance is equal so as to vary the angular speed of each of the plurality of rotor blades relative to one another, as each of the plurality of rotor blades pass around a circumference of the fixed hub.

\* \* \* \* \*